(12) United States Patent
Yamanaka et al.

(10) Patent No.: US 8,188,156 B2
(45) Date of Patent: May 29, 2012

(54) POLYOL COMPOSITION, FOAMING COMPOSITION AND POLYURETHANE FOAM

(75) Inventors: Kenji Yamanaka, Ichihara (JP); Masayoshi Idomoto, Ichihara (JP); Kouji Fukui, Shizuoka (JP); Masashi Obata, Suzhou New District (CN); Katsumi Inaoka, Ichihara (JP); Masaaki Shibata, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/734,552

(22) PCT Filed: Nov. 6, 2008

(86) PCT No.: PCT/JP2008/070220
§ 371 (c)(1),
(2), (4) Date: May 7, 2010

(87) PCT Pub. No.: WO2009/060903
PCT Pub. Date: May 14, 2009

(65) Prior Publication Data
US 2010/0261804 A1    Oct. 14, 2010

(30) Foreign Application Priority Data
Nov. 9, 2007   (JP) ................... 2007-292131

(51) Int. Cl.
*C08G 18/00* (2006.01)
(52) U.S. Cl. ......... 521/170; 521/155; 521/172; 521/174
(58) Field of Classification Search ............. 521/157, 521/170, 172, 174
See application file for complete search history.

(56) References Cited

U.S. PATENT DOCUMENTS

| | | | |
|---|---|---|---|
| 4,256,849 A * | 3/1981 | Ick et al. ................ | 521/129 |
| 5,063,253 A * | 11/1991 | Gansen et al. ............ | 521/159 |
| 5,575,871 A | 11/1996 | Ryoshi et al. | |
| 5,648,019 A * | 7/1997 | White et al. ............ | 252/182.24 |
| 5,677,359 A * | 10/1997 | White et al. ............ | 521/131 |
| 5,684,057 A * | 11/1997 | White et al. ............ | 521/167 |
| 5,750,580 A | 5/1998 | Mayer et al. | |
| 6,472,446 B1 * | 10/2002 | Riley et al. ............ | 521/131 |
| 6,632,851 B2 * | 10/2003 | Haas et al. ............ | 521/174 |
| 6,638,990 B2 * | 10/2003 | Haas et al. ............ | 521/174 |
| 2005/0148677 A1 * | 7/2005 | Elsken et al. ............ | 521/155 |
| 2007/0129452 A1 * | 6/2007 | Clatty et al. ............ | 521/99 |
| 2007/0208095 A1 | 9/2007 | Moore et al. | |
| 2007/0232712 A1 * | 10/2007 | Emge et al. ............ | 521/176 |
| 2010/0227938 A1 * | 9/2010 | Bauer et al. ............ | 521/170 |

FOREIGN PATENT DOCUMENTS

| | | |
|---|---|---|
| DE | 195 21 798 A | 12/1996 |
| EP | 1 734 095 A1 | 12/2006 |
| JP | 7-110097 | 4/1995 |
| JP | 8-073553 | 3/1996 |
| JP | 10-218963 | 8/1998 |
| JP | 11-181045 | 7/1999 |
| JP | 2004-352835 | 12/2004 |
| JP | 2005-008743 | 1/2005 |
| JP | 2006-342305 | 12/2006 |
| JP | 2006-348156 | 12/2006 |

OTHER PUBLICATIONS

International Search Report for PCT/JP2008/070220, completed Jan. 19, 2009, 2 pgs.
Communication (Supplementary EP Search Report) in EP Appln No. 08 84 7096.8 dated Nov. 30, 2011.

* cited by examiner

*Primary Examiner* — Mark Eashoo
*Assistant Examiner* — Melissa Rioja
(74) *Attorney, Agent, or Firm* — Foley & Lardner LLP

(57) ABSTRACT

Disclosed is a polyol composition containing an aromatic polyester polyol having a hydroxyl number of 300-500 mgKOH/g and an average number of functional groups of 2.0-2.5, a medium-chain polyether polyol having a hydroxyl number of 100-250 mgKOH/g and an average number of functional groups of 2.0-4.0 and composed of a polyoxypropylene unit, and a long-chain polyether polyol having a hydroxyl number of 15-40 mgKOH/g, an average number of functional groups of 2.0-4.0 and an oxyethylene content of not more than 14% by weight and mainly composed of a polyoxypropylene unit.

2 Claims, No Drawings

POLYOL COMPOSITION, FOAMING COMPOSITION AND POLYURETHANE FOAM

This application is a National Phase of International Patent Application No. PCT/JP2008/070220, filed Nov. 6, 2008, which in turn claims priority from Japanese Patent Application No. 2007-292131, filed on Nov. 9, 2007. The contents of these applications are incorporated herein by reference in their entirety.

TECHNICAL FIELD

The present invention relates to a polyol composition, a foaming composition, and a polyurethane foam, and more specifically, to a polyol composition, a foaming composition prepared from the polyol composition, and a polyurethane foam produced from the foaming composition.

BACKGROUND ART

Conventionally, rigid polyurethane foams are used as structural members of vehicles or the like. Such rigid polyurethane foam is usually produced by blending a polyol mixture obtained by mixing an aromatic polyester polyol and a polyether polyol, and a polyisocyanate, and foaming the blended mixture.

In this application, the rigid polyurethane foam requires excellent mechanical strength and high open cell content. Therefore, the polyol mixture guarantees mechanical strength mainly with the aromatic polyester polyol and adjusts the closed cell content mainly with the polyether polyol, thereby ensuring these required properties.

For example, in order to produce a rigid polyurethane foam having an open cell structure with excellent mechanical properties, there has been proposed that a polyol mixture obtained by mixing phthalate polyester polyol having a hydroxyl value of 315 mg KOH/g, polyoxypropylene triol having a hydroxyl value of 281 mg KOH/g, and polyoxyethylene oxypropylene triol having a hydroxyl value of 28 mg KOH/g is used (see, for example, the following Patent Document 1).

Patent Document 1: Japanese Unexamined Patent Publication No. 2004-352835

DISCLOSURE OF THE INVENTION

Problems to be Solved

In the polyol mixture described in the above-mentioned Patent Document 1, however, the compatibility between each of the polyol components easily deteriorates, which may fail to foam.

It is an object of the present invention to provide a polyol composition excellent in compatibility, capable of achieving excellent mechanical strength and also ensuring a high open cell content, a foaming composition prepared from the polyol composition, and a polyurethane foam produced from the foaming composition.

Means for Solving the Problem

To achieve the above object, the polyol composition of the present invention includes an aromatic polyester polyol having a hydroxyl value of 300 to 500 mg KOH/g and an average functionality of 2.0 to 2.5; a medium-chain polyether polyol made of a polyoxypropylene unit having a hydroxyl value of 100 to 250 mg KOH/g and an average functionality of 2.0 to 4.0; and a long-chain polyether polyol having a hydroxyl value of 15 to 40 mg KOH/g and an average functionality of 2.0 to 4.0, mainly made of a polyoxypropylene unit having an oxyethylene content of 14% by weight or less.

In the polyol composition of the present invention, it is preferable that the long-chain polyether polyol is consisting of a polyoxypropylene unit.

In the polyol composition of the present invention, it is preferable that the medium-chain polyether polyol is blended in an amount of 30 to 200 parts by weight per 100 parts by weight of the aromatic polyester polyol, and the long-chain polyether polyol is blended in an amount of 10 to 200 parts by weight per 100 parts by weight of the aromatic polyester polyol.

It is preferable that the polyol composition of the present invention further contains a short-chain polyether polyol having a hydroxyl value of 300 to 480 mg KOH/g and an average functionality of 3.0 to 6.0.

In the polyol composition of the present invention, it is preferable that the short-chain polyether polyol is blended in an amount of 50 to 450 parts by weight per 100 parts by weight of the aromatic polyester polyol.

It is preferable that the polyol composition of the present invention further contains dipropylene glycol and has an average hydroxyl value of 250 to 330 mg KOH/g.

The foaming composition of the present invention is prepared from a polyol composition containing an aromatic polyester polyol having a hydroxyl value of 300 to 500 mg KOH/g and an average functionality of 2.0 to 2.5; a medium-chain polyether polyol made of a polyoxypropylene unit having a hydroxyl value of 100 to 250 mg KOH/g and an average functionality of 2.0 to 4.0; and a long-chain polyether polyol having a hydroxyl value of 15 to 40 mg KOH/g and an average functionality of 2.0 to 4.0, mainly made of a polyoxypropylene unit having an oxyethylene content of 14% by weight or less, a polyisocyanate, a catalyst, a blowing agent, and a foam stabilizer.

In the foaming composition of the present invention, it is preferable that the polyisocyanate is polymethylene polyphenylene polyisocyanate represented by the following general formula (1), the polymethylene polyphenylene polyisocyanate being made of 50 to 70% by weight of diphenylmethane diisocyanate where n is 0, and 30 to 50% by weight of polynuclear where n is 1 or more, the diphenylmethane diisocyanate being made of components including 75 to 95% by weight of 4,4'-diphenylmethane diisocyanate, 5 to 25% by weight of 2,4'-diphenylmethane diisocyanate, and 5% by weight or less of 2,2'-diphenylmethane diisocyanate,

[Chem. 1]

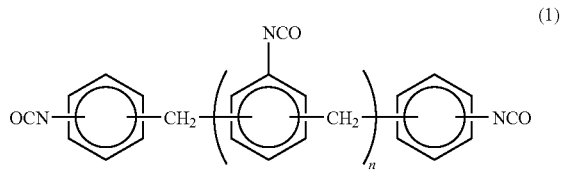

(1)

in the general formula (1), n represents an integer of 0 or more.

The polyurethane foam of the present invention is produced by foaming a foaming composition prepared from a polyol composition containing an aromatic polyester polyol having a hydroxyl value of 300 to 500 mg KOH/g and an average functionality of 2.0 to 2.5; a medium-chain polyether polyol made of a polyoxypropylene unit having a hydroxyl value of 100 to 250 mg KOH/g and an average functionality of 2.0 to 4.0; and a long-chain polyether polyol having a hydroxyl value of 15 to 40 mg KOH/g and an average functionality of 2.0 to 4.0, mainly made of a polyoxypropylene unit having an oxyethylene content of 14% by weight or less, a polyisocyanate, a catalyst, a blowing agent, and a foam stabilizer.

Effect of the Invention

The polyol composition of the present invention is excellent in compatibility, so that it is possible to promote good foaming of the foaming composition of the present invention prepared from the polyol composition. Therefore, the polyurethane foam of the present invention can achieve excellent mechanical strength and can also ensure a high open cell content.

As a result, the polyurethane foam of the present invention is suitably used for constituent articles of various structures, particularly, heat insulation material or sound-absorbing material.

EMBODIMENT OF THE INVENTION

The polyol composition of the present invention contains an aromatic polyester polyol, a medium-chain polyether polyol, and a long-chain polyether polyol.

The aromatic polyester polyol can be obtained by, for example, subjecting aromatic carboxylic acid and polyol to condensation polymerization at such a ratio that the amount of a hydroxyl group of the polyol exceeds that of a carboxyl group of the aromatic carboxylic acid.

The aromatic carboxylic acid is contained in order to guarantee mechanical strength, and examples thereof include aromatic compounds having two or more carboxyl groups', such as phthalic acid, terephthalic acid, isophthalic acid, phthalic anhydride, naphthalene dicarboxylic acid, and trimellitic acid. Among them, phthalic acid and phthalic anhydride are preferable. These aromatic carboxylic acids can be used alone or in combination of two or more kinds.

Examples of the polyol in the aromatic polyester polyol include polyols having two or more hydroxyl groups such as ethylene glycol, diethylene glycol, triethylene glycol, propylene glycol (1,2-propylene glycol), trimethylene glycol, 1,3 or 1,4-butylene glycol, hexamethylene glycol, decamethylene glycol, glycerol, trimethylolpropane, pentaerythritol, and sorbitol. Among them, ethylene glycol, propylene glycol and diethylene glycol are preferable. These polyols can be used alone or in combination of two or more kinds.

Examples of the aromatic polyester polyol further include those obtained by addition polymerization of oxyethylene and/or oxypropylene to those obtained by the condensation polymerization as described above.

Examples of such aromatic polyester polyol include aromatic polyester polyether polyol in which a polyoxyethylene unit [$(CH_2CH_2O)_n$] and/or a polyoxypropylene unit [$(CH(CH_3)CH_2O)_n$] having terminal hydroxyl group is/are bonded to the hydroxyl group of the condensation-polymerized aromatic polyester polyol.

The aromatic polyester polyol has a hydroxyl value (OH value) of 300 to 500 mg KOH/g, or preferably 300 to 400 mg KOH/g, and an average functionality of 2.0 to 2.5, or preferably 2.0 to 2.3.

When the hydroxyl value of the aromatic polyester polyol exceeds the above-mentioned range, friability is produced.

On the other hand, when it is less than the above-mentioned range, the polyurethane foam thus obtained becomes excessively soft.

Further, when the average functionality of the aromatic polyester polyol exceeds the above-mentioned range, the viscosity of the aromatic polyester polyol becomes so high that it may become difficult to use. On the other hand, when it is less than the above-mentioned range, heat resistance deteriorates.

The medium-chain polyether polyol is contained in order to improve compatibility, and can be obtained by addition polymerization of oxypropylene to an initiator such as water, polyhydric alcohols, polyvalent amines, or ammonia.

Examples of the polyhydric alcohol include dihydric to tetrahydric aliphatic polyhydric alcohols such as dihydric aliphatic alcohols such as ethylene glycol, diethylene glycol, propylene glycol, and dipropylene glycol; trihydric aliphatic alcohols such as glycerol and trimethylolpropane; and tetrahydric aliphatic alcohols such as pentaerythritol and diglycerol.

Examples of the polyvalent amines include divalent to tetravalent fatty amines such as divalent fatty amines such as methylamine and ethylamine; trivalent fatty amines such as monoethanolamine, diethanolamine, and triethanolamine; and tetravalent fatty amines such as ethylenediamine, or divalent or tetravalent aromatic amines such as aniline and toluylenediamine.

These initiators can be used alone or in combination of two or more kinds.

Among the initiators, polyhydric alcohol is preferable, trivalent aliphatic alcohol is more preferable, and glycerol is even more preferable.

The medium-chain polyether polyol can be obtained by addition polymerization of oxypropylene to the above-mentioned initiator, as a polyether polyol in which a polyoxypropylene unit containing a terminal hydroxyl group is bonded to a functional group (a hydroxyl group or an amino group) of the initiator.

The medium-chain polyether polyol has a hydroxyl value of 100 to 250 mg KOH/g, preferably 100 to 230 mg KOH/g, or more preferably 145 to 230 mg KOH/g, and an average functionality of 2.0 to 4.0, preferably 2.2 to 3.8, or more preferably 2.5 to 3.5.

When the hydroxyl value of the medium-chain polyether polyol exceeds the above-mentioned range, elongation of the polyurethane foam excessively increases. On the other hand, when the hydroxyl value is less than the above-mentioned range, the compatibility deteriorates. Further, when the average functionality of the medium-chain polyether polyol is outside the above-mentioned range, the compatibility deteriorates.

The mixing proportion of the medium-chain polyether polyol is, for example, from 30 to 200 parts by weight, or preferably from 35 to 100 parts by weight, per 100 parts by weight of the aromatic polyester polyol. When the mixing proportion of the medium-chain polyether polyol exceeds the above-mentioned range, heat resistance may deteriorate. On the other hand, when it is less than the above-mentioned range, the compatibility may deteriorate.

The long-chain polyether polyol is contained (as a communicating agent) in order to improve the open cell content and can be obtained by addition polymerization of mainly the oxypropylene.

Specifically, the long-chain polyether polyol can be obtained mainly by addition polymerization of oxypropylene to the above-mentioned initiator, as a polyether polyol in which mainly a polyoxypropylene unit containing a terminal hydroxyl group is bonded to a functional group (a hydroxyl group or an amino group) of the initiator.

In the long-chain polyether polyol, after the oxypropylene is subjected to addition polymerization, the oxyethylene can further be subjected to addition polymerization. In this case, the long-chain polyether polyol can be obtained as an oxypropylene oxyethylene block copolymer in which a polyoxypropylene unit is bonded to the functional group of the initiator and subsequently, a polyoxyethylene unit having a terminal hydroxyl group is bonded thereto.

The long-chain polyether polyol has an oxyethylene content of 14% by weight or less, preferably 13% by weight or less, or more preferably 0% by weight (that is, when the long-chain polyether polyol is consisting of only a polyoxypropylene unit). The long-chain polyether polyol consisting of only a polyoxypropylene unit allows improvement in mechanical strength.

Such long-chain polyether polyol has a hydroxyl value of 15 to 40 mg KOH/g, preferably 20 to 34 mg KOH/g, or more preferably 28 to 34 mg KOH/g, and an average functionality of 2.0 to 4.0, preferably 2.2 to 3.8, or more preferably 2.5 to 3.5.

When the hydroxyl value of the long-chain polyether polyol exceeds the above-mentioned range, the open cell content deteriorates, thus resulting in reduction of quantity of airflow. On the other hand, when the hydroxyl value is less than the above-mentioned range, the compatibility deteriorates. Further, when the average functionality of the long-chain polyether polyol is outside the above-mentioned range, the compatibility deteriorates.

The mixing proportion of the long-chain polyether polyol is, for example, from 10 to 200 parts by weight, or preferably from 10 to 75 parts by weight, per 100 parts by weight of the aromatic polyester polyol. When the mixing proportion of the long-chain polyether polyol exceeds the above-mentioned range, a foaming composition is prepared to form a polyurethane foam which may have a slightly coarse cell. On the other hand, when it is less than the above-mentioned range, the open cell content may deteriorate, thus resulting in reduction of quantity of airflow.

Further, a short-chain polyether polyol and dipropylene glycol can be contained in the polyol composition.

The short chain polyether polyol is optionally contained in order to improve the heat resistance and dimensional stability of the polyurethane foam, and can be obtained by addition polymerization of oxypropylene and/or oxyethylene to the initiator, for example.

Examples of the initiator include, in addition to the above-mentioned dihydric to tetrahydric initiators, hexahydric aliphatic alcohols such as sorbitol, or octahydric alicyclic alcohols such as sucrose. These initiators can be used alone or in combination of two or more kinds.

Among these initiators, polyhydric alcohols are preferable, or aliphatic polyhydric alcohols such as dihydric, trihydric, or hexahydric alcohols are more preferable.

The short-chain polyether polyol is obtained by addition polymerization of oxypropylene and/or oxyethylene to the above-mentioned initiator.

Thus, the short chain polyether polyol is obtained as a polyether polyol in which a polyoxypropylene unit and/or a polyoxyethylene unit having a terminal hydroxyl group is/are bonded to a functional group (a hydroxyl group or an amino group) of the initiator. A polyether polyol in which only a polyoxypropylene unit having a terminal hydroxyl group is bonded to the functional group of the initiator, that is, a polyether polyol having only oxypropylene addition-polymerized is preferable.

The short-chain polyether polyol has a hydroxyl value of, for example, 300 to 480 mg KOH/g, more preferably 300 to 450 mg KOH/g, or even more preferably 300 to 400 mg KOH/g, and an average functionality of, for example, 3.0 to 6.0, preferably 3.0 to 5.0, or more preferably 3.0 to 4.0.

When the hydroxyl value of the short-chain polyether polyol exceeds the above-mentioned range, the open cell content may deteriorate, thus resulting in reduction of quantity of airflow. On the other hand, when the hydroxyl value is less than the above-mentioned range, improvement in heat resistance may be insufficient. Further, when the average functionality of the short-chain polyether polyol is outside the above-mentioned range, the compatibility may deteriorate.

The mixing proportion of the short-chain polyether polyol is, for example, from 50 to 450 parts by weight, or preferably from 50 to 200 parts by weight, per 100 parts by weight of the aromatic polyester polyol. When the mixing proportion of the short-chain polyether polyol exceeds the above-mentioned range, a foaming composition is prepared to form a polyurethane foam which may be partially shrunk. On the other hand, when it is less than the above-mentioned range, the effect of improvement in heat resistance and dimensional stability may not be obtained.

The dipropylene glycol is optionally contained in order to adjust the average hydroxyl value in the polyol composition or to improve compatibility.

The mixing proportion of the dipropylene glycol is, for example, from 10 to 70 parts by weight, or preferably from 10 to 30 parts by weight, per 100 parts by weight of the aromatic polyester polyol. When the mixing proportion of the dipropylene glycol exceeds the above-mentioned range, the average hydroxyl value of the polyol composition excessively increases, so that scorch (burn) may occur on the polyurethane foam. On the other hand, when it is less than the above-mentioned range, the effect of improvement in heat resistance and dimensional stability may not be obtained.

The polyol composition of the present invention can be obtained by blending an aromatic polyester polyol, a medium-chain polyether polyol, and a long-chain polyether polyol, and optionally, a short chain polyether polyol and dipropylene glycol.

The polyol composition thus obtained has an average hydroxyl value of, for example, 240 to 330 mg KOH/g, or preferably 260 to 320 mg KOH/g. When the average hydroxyl value of the polyol composition exceeds the above-mentioned range, scorch may occur. On the other hand, when it is less than the above-mentioned range, the polyurethane foam may become soft or have insufficient heat resistance.

In order to obtain the polyurethane foam of the present invention, the foaming composition of the present invention is first prepared from the polyol composition of the present invention, polyisocyanate, a catalyst, a blowing agent, and a foam stabilizer. More specifically, the polyol composition, a blowing agent, and a foam stabilizer are first mixed, and a catalyst and polyisocyanate are sequentially added to the mixture (OH component).

Known blowing agents usually used for producing a polyurethane foam can be used as the blowing agent. Examples of the blowing agent include water; and halogen substituted aliphatic hydrocarbon blowing agents such as trichlorofluoromethane, dichlorodifluoromethane, trichloroethane, trichloroethylene, tetrachloroethylene, methylene chloride, trichlorofluoroethane, dibromotetrafluoroethane, and carbon tetrachloride. These blowing agents can be used alone or in combination of two or more kinds. Among them, water is preferable.

The mixing proportion of the blowing agent is, for example, from 2.0 to 8.0 parts by weight, preferably from 2.0 to 7.0 parts by weight, or more preferably from 3.5 to 6.5 parts by weight, per 100 parts by weight of the polyol composition.

Known foam stabilizers usually used for producing a polyurethane foam can be used as the foam stabilizer, and examples thereof include a siloxane-oxyalkylene block copolymer.

The mixing proportion of the foam stabilizer is, for example, from 0.5 to 5.0 parts by weight, or preferably from 1.0 to 4.0 parts by weight, per 100 parts by weight of the polyol composition.

Further, if necessary, additives such as chain extender, flame retardant, coloring agent, plasticizer, antioxidant, and ultraviolet absorber can be blended with the OH component at an appropriate mixing proportion.

Known polyisocyanates usually used for producing a polyurethane foam can be used as the polyisocyanate. Examples of the polyisocyanate include aromatic polyisocyanates such as 2,4- or 2,6-tolylene diisocyanate (TDI), phenylene diisocyanate, naphthalene diisocyanate (NDI), and polymethylene polyphenylene polyisocyanate (Pure MDI); aralkyl polyisocyanates such as 1,3- or 1,4-xylylene diisocyanate (XDI); aliphatic polyisocyanates such as hexamethylene diisocyanate (HDI) and tetramethylene diisocyanate; alicyclic polyisocyanates such as 3-isocyanatomethyl-3,5,5-trimethyl cyclohexylisocyanate (IPDI), 4,4'-methylenebis (cyclohexylisocyanate) ($H_{12}$MDI), 1,3- or 1,4-bis (isocyanatomethyl)cyclohexane ($H_6$XDI), and bis (isocyanatomethyl) norbornane (NBDI); and polyol-, carbodiimide-, biuret-, and allophanate-modified polyisocyanates, multimers (polynuclears with dimers or higher multimers) of the polyisocyanates, or polymethylene polyphenylene polyisocyanate (crude MDI, polymeric MDI). These polyisocyanates can be used alone or in combination of two or more kinds. Among them, polymethylene polyphenylene polyisocyanate (crude MDI) is preferable.

More specifically, such polymethylene polyphenylene polyisocyanate is represented by the following general formula (1):

[Chem. 2]

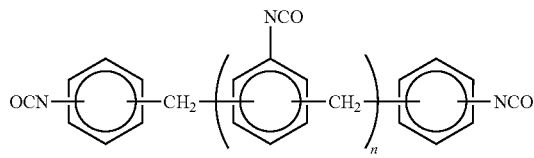
(1)

In the general formula (1), n represents an integer of 0 or more.

The polymethylene polyphenylene polyisocyanate is a crude MDI made of diphenylmethane diisocyanate (in the general formula (1), when n is 0, MDI; dinuclear) and a polynuclear (in the general formula (1), when n is 1 or more, trinuclear or higher). The contents of the respective components in the polymethylene polyphenylene polyisocyanate are, for example, 50 to 70% by weight, or preferably 55 to 65% by weight of MDI, and, for example, 30 to 50% by weight, or preferably 35 to 45% by weight of the polynuclear.

The MDI is made of components of 4,4'-MDI, 2,4'-MDI, and optionally contained 2,2'-MDI, and the contents of the respective components are, for example, 75 to 95% by weight, or preferably, 80 to 90% by weight of 4,4'-MDI; for example, 5 to 25% by weight, or preferably, 10 to 20% by weight of 2,4'-MDI; and, for example, 5% by weight or less, or preferably 2% by weight or less of 2,2'-MDI.

The polyisocyanate is blended in such a proportion that, for example, the isocyanate index (equivalent of the isocyanate group to 100 eq. of the hydroxyl group in the polyol composition) of the foaming composition is, for example, 60 to 500, or preferably, 100 to 150.

Known catalysts usually used for producing a polyurethane foam can be used as the catalyst. Examples of the catalyst include amine catalysts including tertiary amines such as triethylamine, triethylenediamine, N,N-dimethylamino hexanol, and N-methylmorpholine, quaternary ammonium salts such as tetraethylhydroxyl ammonium, imidazoles such as imidazole and 2-ethyl-4-methylimidazole; and organic metal catalysts including organic tin compounds such as tin acetate, tin octylate, dibutyltin dilaurate, and dibutyltin chloride, organic lead compounds such as lead octylate and lead naphthenate, and organic nickel compounds such as nickel naphthenate. These catalysts can be used alone or in combination of two or more kinds. Among them, an amine catalyst is preferable.

The mixing proportion of the catalyst is, for example, from 0.1 to 1.0 part by weight, or preferably from 0.2 to 0.5 parts by weight, per 100 parts by weight of the polyol composition.

Next, each of the components of the foaming composition is blended to be foamed. More specifically, a catalyst and polyisocyanate are sequentially added to the mixture (OH component) containing a polyol composition, a blowing agent, a foam stabilizer, and, if necessary, an additive to prepare a foaming composition, and the foaming composition is foamed. Thus, the polyurethane foam of the present invention can be obtained.

The foaming composition is foamed, for example, using a mold (open mold) foaming process, a slab (continuous slab) foaming process, or a spraying process.

Since the above-mentioned polyol composition is excellent in compatibility, it is possible to promote good foaming of the foaming composition prepared from the polyol composition. Therefore, the polyurethane foam thus produced can achieve excellent mechanical strength and can also ensure a high open cell content.

As a result, the polyurethane foam is obtained as a rigid polyurethane foam and is used for components of various structures, specifically, components (ceiling material, etc.) of vehicles (automobile, train, etc.), vessels, airplanes, houses, buildings, or the like. Preferably, the polyurethane foam is used as heat insulation material or sound-absorbing material.

EXAMPLES

While in the following, the present invention will be specifically described with reference to Examples and Comparative Examples, the present invention is not limited to any of them.

1) The following raw materials were used.

(Aromatic Polyester Polyol)

Aromatic polyester polyol A: Obtained by subjecting phthalic anhydride, and ethylene glycol and diethylene glycol to ring-opening polymerization, and then subjecting oxypropylene to addition polymerization. Has a hydroxyl value of 365 mg KOH/g and an average functionality of 2.

Aromatic polyester polyol B: Obtained by subjecting phthalic anhydride and diethylene glycol to condensation polymerization. Has a hydroxyl value of 440 mg KOH/g and an average functionality of 2.

(Medium-Chain Polyether Polyol)

Medium-chain polyether polyol C: Polyoxypropylene triol obtained by subjecting oxypropylene to addition polymerization using glycerol as an initiator. Has a hydroxyl value of 160 mg KOH/g and an average functionality of 3.

G-250: Trade name (PPG-Triol series, manufactured by Mitsui Chemicals Polyurethanes, Inc.) Polyoxypropylene triol obtained by subjecting oxypropylene to addition polymerization using glycerol as an initiator. Has a hydroxyl value of 250 mg KOH/g and an average functionality of 3.

Medium-chain polyether polyol D: Polyoxypropylene triol obtained by subjecting oxypropylene to addition polymerization using glycerol as an initiator. Has a hydroxyl value of 280 mg KOH/g and an average functionality of 3.

(Long-Chain Polyether Polyol)

Long-chain polyether polyol E: Polyoxypropylene triol obtained by subjecting oxypropylene to addition polymerization using glycerol as an initiator. Has a hydroxyl value of 34 mg KOH/g and an average functionality of 3.

Long-chain polyether polyol F: Polyethertriol obtained by sequentially subjecting oxypropylene and oxyethylene to addition polymerization using glycerol as an initiator. Contains 14% by weight of oxyethylene. Has a hydroxyl value of 28 mg KOH/g and an average functionality of 3.

Long-chain polyether polyol G: Polyethertriol obtained by sequentially subjecting oxypropylene and oxyethylene to addition polymerization using glycerol as an initiator. Contains 15% by weight of oxyethylene. Has a hydroxyl value of 28 mg KOH/g and an average functionality of 3.

(Short-Chain Polyether Polyol)

Short-chain polyether polyol H: Polyoxypropylenetetraol obtained by subjecting oxypropylene to addition polymerization using pentaerythritol as an initiator. Has a hydroxyl value of 350 mg KOH/g and an average functionality of 4.

SOR-400: Trade name (manufactured by Mitsui Chemicals Polyurethanes, Inc.) Polyoxypropylene hexanol obtained by subjecting oxypropylene to addition polymerization using sorbitol as an initiator. Has a hydroxyl value of 400 mg KOH/g and an average functionality of 6.

G-410: Trade name (manufactured by Mitsui Chemicals Polyurethanes, Inc.) Polyoxypropylene triol obtained by subjecting oxypropylene to addition polymerization using glycerol as an initiator. Has a hydroxyl value of 400 mg KOH/g and an average functionality of 3.

GR-09: Trade name (manufactured by Mitsui Chemicals Polyurethanes, Inc.) Polyethertriol obtained by sequentially subjecting oxypropylene and oxyethylene to addition polymerization using glycerol as an initiator. Contains 15% by weight of oxyethylene. Has a hydroxyl value of 400 mg KOH/g and an average functionality of 3.

(Blowing Agent)

Water (Foam Stabilizer)

SRX-280A: Trade name (siloxane-oxyalkylene block copolymer, manufactured by Dow Corning Toray Co., Ltd.)

SRX-294A: Trade name (siloxane-oxyalkylene block copolymer, manufactured by Dow Corning Toray Co., Ltd.)

(Catalyst)

KAOLIZER No. 25: Trade name (N,N-dimethylamino hexanol, manufactured by Kao Corporation)

MINICOR-9000: Trade name (imidazoles, manufactured by Katsuzai Chemicals Corp.)

(Polyisocyanate)

Crude MDI: MDI/polynuclear=60% by weight/40% by weight, 4,4'-MDI/2,4'-MDI/2,2'-MDI=90% by weight/9% by weight/1% by weight 2) Production of Polyurethane Foam According to the formulation of the following Tables 1 and 2, a polyol composition containing an aromatic polyester polyol, a medium-chain polyether polyol (except Comparative Example 1), a long-chain polyether polyol, a short-chain polyether polyol (except Examples 5, 12, and 13), and dipropylene glycol (except Examples 11 and 12) was prepared. The blowing agent and the foam stabilizer were mixed with the polyol composition.

Thereafter, the polyol composition (OH component) thus mixed was stirred with a hand mixer, a catalyst was added thereto, and the resulting mixture was stirred for 5 seconds. Immediately thereafter, polyisocyanate was added according to the isocyanate index in Table 1 and mixed to give a foaming composition. Then, the foaming composition was supplied to a foaming box, and foamed and cured. The polyurethane foam thus obtained was allowed to stand at room temperature for a day. In Comparative Examples 1 and 2, foaming of the foaming composition was poor, and in Comparative Example 3, the foaming composition was shrunked during foaming.

3) Evaluation

In each of Examples and Comparative Examples, the compatibility was evaluated during the preparation of the polyol composition. In the foaming, the cream time in Examples 1 to 17 and Comparative Example 3 and the gel time in Examples 1 to 17 were determined. Each of the density, quantity of airflow, tensile strength, elongation, and glass transition point of the polyurethane foam in Examples 1 to 17 was determined according to JIS K 6400 (1997). In each of Examples and Comparative Examples, the foaming of the cell and the state of the cell in the polyurethane foam were observed.

The results are shown in Tables 1 and 2.

TABLE 1

| | | Raw Material | | Hydroxyl Value mgKOH/g | Addition Polymerization Unit | Average Functionality | Initiator | Ex. 1 | Ex. 2 | Ex. 3 | Ex. 4 | Ex. 5 |
|---|---|---|---|---|---|---|---|---|---|---|---|---|
| Foaming Composition | Polyol Composition | Aromatic Polyester Polyol | A | 365 | PO | 2 | — | 40 | 40 | 40 | 30 | 35 |
| | | | B | 440 | — | 2 | — | — | — | — | — | — |
| | | Medium-Chain Polyether Polyol | C | 160 | PO | 3 | Glycerol | 20 | 20 | — | 20 | — |
| | | | G-250 | 250 | PO | 3 | Glycerol | — | — | 20 | — | 25 |
| | | | D | 280 | PO | 3 | Glycerol | — | — | — | — | — |
| | | Long-Chain Polyether Polyol | E | 34 | PO | 3 | Glycerol | 10 | 10 | 10 | 20 | 10 |
| | | | F | 28 | PO/EO (14% EO) | 3 | Glycerol | — | — | — | — | 20 |
| | | | G | 28 | PO/EO (15% EO) | 3 | Glycerol | — | — | — | — | — |
| | | Short-Chain Polyether | H | 350 | PO | 4 | Pentaerythritol | 25 | — | 25 | 20 | — |
| | | | SOR-400 | 400 | PO | 6 | Sorbitol | — | 25 | — | — | — |

TABLE 1-continued

| | | | | | | | | | | | | |
|---|---|---|---|---|---|---|---|---|---|---|---|---|
| | | Polyol | G-410 | 400 | PO | 3 | Glycerol | — | — | — | — | — |
| | | | GR-09 | 400 | PO/EO (15% EO) | 3 | Glycerol | — | — | — | — | — |
| | Dipropylene Glycol | | 837 | PO | 2 | PO | | 5 | 5 | 5 | 10 | 10 |
| | Average Hydroxyl Value of Polyol Composition | | | | | | | 311 | 323 | 329 | 302 | 283 |
| Blowing Agent | | | Water | | | | | 4.5 | 4.5 | 4.5 | 4.5 | 4.5 |
| Foam Stabilizer | | | SRX-280A | | | | | 2 | 2 | 2 | 2 | — |
| | | | SRX-294A | | | | | — | — | — | — | 2 |
| Catalyst | | | KAOLIZER No. 25 | | | | | — | 0.3 | 0.3 | — | — |
| | | | MINICO R-9000 | | | | | 0.3 | — | — | 0.3 | 0.3 |
| Polyisocyanate | | | Crude MDI | | | | | 168 | 172 | 173 | 166 | 160 |
| | Isocyanate Index | | | | | | | 130 | 130 | 130 | 130 | 130 |
| Evaluation | | Polyol Composition | | | Compatibility | | | Good | Good | Good | Good | Good |
| | Foaming Composition | | | | Cream Time (sec) | | | 93 | 90 | 92 | 91 | 88 |
| | | | | | Gel Time (sec) | | | 280 | 275 | 273 | 280 | 272 |
| | Polyurethane Foam | | | | Density (kg/m³) | | | 33 | 34 | 32 | 34 | 31 |
| | | | | | Quantity of Airflow (cm³·cm⁻²·s⁻¹) | | | 0.5 | 0.3 | 0.6 | 1.5 | 0.5 |
| | | | | | Tensile Strength (Mpa) | | | 310 | 270 | 280 | 260 | 280 |
| | | | | | Elongation (%) | | | 16 | 13 | 13 | 14 | 25 |
| | | | | | Glass Transition Point (°C.) | | | 186 | 195 | 188 | 184 | 180 |
| | | | | | States of Foaming and Cell | | | Good | Good | Good | Good | Good |

| | | Raw Material | | Hydroxyl Value mgKOH/g | Addition Polymerization Unit | Average Functionality | Initiator | Ex. 6 | Ex. 7 | Ex. 8 | Ex. 9 | Ex. 10 |
|---|---|---|---|---|---|---|---|---|---|---|---|---|
| Foaming Composition | Polyol Composition | Aromatic Polyester Polyol | A | 365 | PO | 2 | — | 20 | — | 30 | 40 | 40 |
| | | | B | 440 | — | 2 | — | — | 20 | — | — | — |
| | | Medium-Chain Polyether Polyol | C | 160 | PO | 3 | Glycerol | 25 | 20 | 10 | 20 | 20 |
| | | | G-250 | 250 | PO | 3 | Glycerol | — | — | — | — | — |
| | | | D | 280 | PO | 3 | Glycerol | — | — | — | — | — |
| | | Long-Chain Polyether Polyol | E | 34 | PO | 3 | Glycerol | 15 | 20 | 20 | 10 | 10 |
| | | | F | 28 | PO/EO (14% EO) | 3 | Glycerol | — | — | — | — | — |
| | | | G | 28 | PO/EO (15% EO) | 3 | Glycerol | — | — | — | — | — |
| | | Short-Chain Polyether Polyol | H | 350 | PO | 4 | Pentaerythritol | — | 30 | 30 | 25 | 25 |
| | | | SOR-400 | 400 | PO | 6 | Sorbitol | — | — | — | — | — |
| | | | G-410 | 400 | PO | 3 | Glycerol | 30 | — | — | — | — |
| | | | GR-09 | 400 | PO/EO (15% EO) | 3 | Glycerol | — | — | — | — | — |
| | Dipropylene Glycol | | 837 | PO | 2 | PO | | 10 | 10 | 10 | 5 | 5 |
| | Average Hydroxyl Value of Polyol Composition | | | | | | | 322 | 315 | 321 | 311 | 311 |
| Blowing Agent | | | Water | | | | | 4.5 | 4.5 | 4.0 | 4.5 | 5.5 |
| Foam Stabilizer | | | SRX-280A | | | | | 2 | — | 2 | 2 | 2 |
| | | | SRX-294A | | | | | — | 2 | — | — | — |
| Catalyst | | | KAOLIZER No. 25 | | | | | — | 0.3 | 0.3 | — | — |
| | | | MINICO R-9000 | | | | | 0.3 | — | — | 1.2 | 0.3 |
| Polyisocyanate | | | Crude MDI | | | | | 171 | 169 | 169 | 167 | 170 |
| | Isocyanate Index | | | | | | | 130 | 130 | 135 | 130 | 120 |
| Evaluation | | Polyol Composition | | | Compatibility | | | Good | Good | Good | Good | Good |
| | Foaming Composition | | | | Cream Time (sec) | | | 90 | 85 | 95 | 30 | 82 |
| | | | | | Gel Time (sec) | | | 280 | 260 | 290 | 105 | 262 |
| | Polyurethane Foam | | | | Density (kg/m³) | | | 32 | 34 | 35 | 31 | 32 |
| | | | | | Quantity of Airflow (cm³·cm⁻²·s⁻¹) | | | 0.6 | 0.3 | 0.6 | 3.0 | 0.6 |
| | | | | | Tensile Strength (Mpa) | | | 290 | 270 | 290 | 320 | 300 |
| | | | | | Elongation (%) | | | 18 | 13 | 16 | 14 | 17 |
| | | | | | Glass Transition Point (°C.) | | | 177 | 193 | 188 | 194 | 180 |
| | | | | | States of Foaming and Cell | | | Good | Good | Good | Good | Good |

TABLE 2

| | | Raw Material | | Hydroxyl Value mgKOH/g | Addition Polymerization Unit | Average Functionality | Initiator | Ex. 11 | Ex. 12 | Ex. 13 |
|---|---|---|---|---|---|---|---|---|---|---|
| Foaming Composition | Polyol Composition | Aromatic Polyester Polyol | A | 365 | PO | 2 | — | 50 | 50 | 30 |
| | | | B | 440 | — | 2 | — | — | — | — |
| | | Medium-Chain Polyether Polyol | C | 160 | PO | 3 | Glycerol | 20 | 45 | 15 |
| | | | G-250 | 250 | PO | 3 | Glycerol | — | — | — |
| | | | D | 280 | PO | 3 | Glycerol | — | — | — |
| | | Long-Chain Polyether Polyol | E | 34 | PO | 3 | Glycerol | 5 | 5 | 30 |
| | | | F | 28 | PO/EO | 3 | Glycerol | — | — | 5 |

TABLE 2-continued

| | | | | | | | | | |
|---|---|---|---|---|---|---|---|---|---|
| | | | G | 28 | PO/EO (14% EO) | 3 | Glycerol | — | — | — |
| | Short-Chain Polyether Polyol | | H | 350 | (15% EO) PO | 4 | Pentaerythritol | 25 | — | — |
| | | | SOR-400 | 400 | PO | 6 | Sorbitol | — | — | — |
| | | | G-410 | 400 | PO | 3 | Glycerol | — | — | — |
| | | | GR-09 | 400 | PO/EO (15% EO) | 3 | Glycerol | — | — | — |
| | Dipropylene Glycol | | | 837 | PO | 2 | PO | — | — | 20 |
| | Average Hydroxyl Value of Polyol Composition | | | | | | | 304 | 256 | 312 |
| Blowing Agent | | | | | Water | | | 4.5 | 4.5 | 4.5 |
| Foam Stabilizer | | | | | SRX-280A | | | 2 | 2 | 2 |
| | | | | | SRX-294A | | | — | — | — |
| Catalyst | | | | | KAOLIZER No. 25 | | | — | — | 0.3 |
| | | | | | MINICO R-9000 | | | 0.3 | 0.3 | — |
| Polyisocyanate | | | | | Crude MDI | | | 166 | 152 | 168 |
| | | | Isocyanate Index | | | | | 130 | 130 | 130 |
| Evaluation | | | Polyol Composition | | Compatibility | | | Good | Good | Good |
| | | | Foaming Composition | | Cream Time (sec) | | | 75 | 77 | 88 |
| | | | | | Gel Time (sec) | | | 254 | 260 | 260 |
| | | | Polyurethane Foam | | Density (kg/m³) | | | 32 | 33 | 34 |
| | | | | | Quantity of Airflow (cm³·cm⁻²·s⁻¹) | | | 4.1 | 0.3 | 8.1 |
| | | | | | Tensile Strength (Mpa) | | | 320 | 310 | 250 |
| | | | | | Elongation (%) | | | 16 | 23 | 13 |
| | | | | | Glass Transition Point (°C.) | | | 175 | 153 | 170 |
| | | | | | States of Foaming and Cell | | | Good | Good | Slightly Coarse Cell |

| | | Raw Material | | Hydroxyl Value mgKOH/g | Addition Polymerization Unit | Average Functionality | Initiator | Ex. 14 | Ex. 15 | Ex. 16 |
|---|---|---|---|---|---|---|---|---|---|---|
| Foaming Composition | Polyol Composition | Aromatic Polyester Polyol | A | 365 | PO | 2 | — | 10 | 20 | 50 |
| | | | B | 440 | — | 2 | — | — | — | — |
| | | Medium-Chain Polyether Polyol | C | 160 | PO | 3 | Glycerol | — | 25 | 45 |
| | | | G-250 | 250 | PO | 3 | Glycerol | 20 | — | — |
| | | | D | 280 | PO | 3 | Glycerol | — | — | — |
| | | Long-Chain Polyether Polyol | E | 34 | PO | 3 | Glycerol | 20 | — | 5 |
| | | | F | 28 | PO/EO (14% EO) | 3 | Glycerol | — | 15 | — |
| | | | G | 28 | PO/EO (15% EO) | 3 | Glycerol | — | — | — |
| | | Short-Chain Polyether Polyol | H | 350 | PO | 4 | Pentaerythritol | 45 | — | — |
| | | | SOR-400 | 400 | PO | 6 | Sorbitol | — | — | — |
| | | | G-410 | 400 | PO | 3 | Glycerol | — | — | — |
| | | | GR-09 | 400 | PO/EO (15% EO) | 3 | Glycerol | — | 30 | — |
| | Dipropylene Glycol | | | 837 | PO | 2 | PO | 5 | 10 | — |
| | Average Hydroxyl Value of Polyol Composition | | | | | | | 293 | 321 | 256 |
| Blowing Agent | | | | | Water | | | 4.5 | 4.8 | 7.0 |
| Foam Stabilizer | | | | | SRX-280A | | | 2 | — | 2 |
| | | | | | SRX-294A | | | — | 2 | — |
| Catalyst | | | | | KAOLIZER No. 25 | | | — | 0.3 | — |
| | | | | | MINICO R-9000 | | | 0.3 | — | 0.3 |
| Polyisocyanate | | | | | Crude MDI | | | 163 | 171 | 178 |
| | | | Isocyanate Index | | | | | 130 | 130 | 110 |
| Evaluation | | | Polyol Composition | | Compatibility | | | Good | Good | Good |
| | | | Foaming Composition | | Cream Time (sec) | | | 85 | 85 | 65 |
| | | | | | Gel Time (sec) | | | 265 | 260 | 245 |
| | | | Polyurethane Foam | | Density (kg/m³) | | | 32 | 31 | 22 |
| | | | | | Quantity of Airflow (cm³·cm⁻²·s⁻¹) | | | 0.3 | 0.3 | 5.0 |
| | | | | | Tensile Strength (Mpa) | | | 270 | 220 | 230 |
| | | | | | Elongation (%) | | | 13 | 20 | 22 |
| | | | | | Glass Transition Point (°C.) | | | 180 | 175 | 181 |
| | | | | | States of Foaming and Cell | | | Partially Shrunk | Good | Good |

| | | Raw Material | | Hydroxyl Value mgKOH/g | Addition Polymerization Unit | Average Functionality | Initiator | Ex. 17 | Comp. Ex. 1 | Comp. Ex. 2 |
|---|---|---|---|---|---|---|---|---|---|---|
| Foaming Composition | Polyol Composition | Aromatic Polyester Polyol | A | 365 | PO | 2 | — | 40 | 30 | 40 |
| | | | B | 440 | — | 2 | — | — | — | — |
| | | Medium-Chain Polyether Polyol | C | 160 | PO | 3 | Glycerol | 50 | — | — |
| | | | G-250 | 250 | PO | 3 | Glycerol | — | — | — |
| | | | D | 280 | PO | 3 | Glycerol | — | — | 20 |
| | | Long-Chain | E | 34 | PO | 3 | Glycerol | 10 | 30 | 10 |

TABLE 2-continued

|  |  | Raw Material |  | Hydroxyl Value mgKOH/g | Addition Polymerization Unit | Average Functionality | Initiator |  |  |  |
|---|---|---|---|---|---|---|---|---|---|---|
|  |  | Polyether Polyol | F | 28 | PO/EO (14% EO) | 3 | Glycerol | — | — | — |
|  |  |  | G | 28 | PO/EO (15% EO) | 3 | Glycerol | — | — | — |
|  |  | Short-Chain Polyether Polyol | H | 350 | PO | 4 | Pentaerythritol | — | 25 | 25 |
|  |  |  | SOR-400 | 400 | PO | 6 | Sorbitol | — | — | — |
|  |  |  | G-410 | 400 | PO | 3 | Glycerol | — | — | — |
|  |  |  | GR-09 | 400 | PO/EO (15% EO) | 3 | Glycerol | — | — | — |
|  |  | Dipropylene Glycol |  | 837 | PO | 2 | PO | — | 15 | 5 |
|  |  | Average Hydroxyl Value of Polyol Composition |  |  |  |  |  | 229 | 332 | 335 |
| Blowing Agent |  |  |  | Water |  |  |  | 7.0 | 4.5 | 4.5 |
| Foam Stabilizer |  |  |  | SRX-280A |  |  |  | 2 | 2 | 2 |
|  |  |  |  | SRX-294A |  |  |  | — | — | — |
| Catalyst |  |  |  | KAOLIZER No. 25 |  |  |  | — | 0.3 | — |
|  |  |  |  | MINICO R-9000 |  |  |  | 0.3 | — | 0.3 |
| Polyisocyanate |  |  |  | Crude MDI |  |  |  | 171 | 174.1 | 175 |
|  |  | Isocyanate Index |  |  |  |  |  | 110 | 130 | 130 |
| Evaluation |  | Polyol Composition |  |  | Compatibility |  |  | Good | Poor | Poor |
|  |  | Foaming Composition |  |  | Cream Time (sec) |  |  | 65 | — | — |
|  |  |  |  |  | Gel Time (sec) |  |  | 230 | — | — |
|  |  | Polyurethane Foam |  |  | Density (kg/m³) |  |  | 21 | — | — |
|  |  |  |  |  | Quantity of Airflow (cm³·cm⁻²·s⁻¹) |  |  | 0.3 | — | — |
|  |  |  |  |  | Tensile Strength (Mpa) |  |  | 200 | — | — |
|  |  |  |  |  | Elongation (%) |  |  | 19 | — | — |
|  |  |  |  |  | Glass Transition Point (° C.) |  |  | 180 | — | — |
|  |  |  |  |  | States of Foaming and Cell |  |  | Good | Poor | Poor |

|  |  | Raw Material |  | Hydroxyl Value mgKOH/g | Addition Polymerization Unit | Average Functionality | Initiator | Comp. Ex. 3 |
|---|---|---|---|---|---|---|---|---|
| Foaming Composition | Polyol Composition | Aromatic Polyester Polyol | A | 365 | PO | 2 | — | 25 |
|  |  |  | B | 440 | — | 2 | — | — |
|  |  | Medium-Chain Polyether Polyol | C | 160 | PO | 3 | Glycerol | 20 |
|  |  |  | G-250 | 250 | PO | 3 | Glycerol | — |
|  |  |  | D | 280 | PO | 3 | Glycerol | — |
|  |  | Long-Chain Polyether Polyol | E | 34 | PO | 3 | Glycerol | — |
|  |  |  | F | 28 | PO/EO (14% EO) | 3 | Glycerol | — |
|  |  |  | G | 28 | PO/EO (15% EO) | 3 | Glycerol | 30 |
|  |  | Short-Chain Polyether Polyol | H | 350 | PO | 4 | Pentaerythritol | 20 |
|  |  |  | SOR-400 | 400 | PO | 6 | Sorbitol | — |
|  |  |  | G-410 | 400 | PO | 3 | Glycerol | — |
|  |  |  | GR-09 | 400 | PO/EO (15% EO) | 3 | Glycerol | — |
|  |  | Dipropylene Glycol |  | 837 | PO | 2 | PO | 5 |
|  |  | Average Hydroxyl Value of Polyol Composition |  |  |  |  |  | 244 |
| Blowing Agent |  |  |  | Water |  |  |  | 4.5 |
| Foam Stabilizer |  |  |  | SRX-280A |  |  |  | 2 |
|  |  |  |  | SRX-294A |  |  |  | — |
| Catalyst |  |  |  | KAOLIZER No. 25 |  |  |  | — |
|  |  |  |  | MINICO R-9000 |  |  |  | 0.3 |
| Polyisocyanate |  |  |  | Crude MDI |  |  |  | 149 |
|  |  | Isocyanate Index |  |  |  |  |  | 130 |
| Evaluation |  | Polyol Composition |  |  | Compatibility |  |  | Good |
|  |  | Foaming Composition |  |  | Cream Time (sec) |  |  | 90 |
|  |  |  |  |  | Gel Time (sec) |  |  | — |
|  |  | Polyurethane Foam |  |  | Density (kg/m³) |  |  | — |
|  |  |  |  |  | Quantity of Airflow (cm³·cm⁻²·s⁻¹) |  |  | — |
|  |  |  |  |  | Tensile Strength (Mpa) |  |  | — |
|  |  |  |  |  | Elongation (%) |  |  | — |
|  |  |  |  |  | Glass Transition Point (° C.) |  |  | — |
|  |  |  |  |  | States of Foaming and Cell |  |  | Shrunk |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The polyurethane foam produced by foaming the foaming composition prepared from the polyol composition of the present invention is obtained as a rigid polyurethane foam and is used for components of various structures, specifically, components (ceiling material, etc.) of vehicles (automobile, train, etc.), vessels, airplanes, houses, buildings, or the like.

The invention claimed is:

1. A polyurethane foam produced by foaming a foaming composition prepared from
    a polyol composition comprising:
        an aromatic polyester polyol having a hydroxyl value of 300 to 500 mg KOH/g and an average functionality of 2.0 to 2.5;
        a medium-chain polyether polyol comprising oxyalkylene units wherein the oxyalkylene units consist of polyoxypropylene units and having a hydroxyl value of 100 to 250 mg KOH/g and an average functionality of 2.0 to 4.0; and
        a long-chain polyether polyol having a hydroxyl value of 15 to 40 mg KOH/g and an average functionality of 2.0 to 4.0, mainly made of a polyoxypropylene unit having an oxyethylene content of 14% by weight or less,
    a polyisocyanate,
    a catalyst,
    a blowing agent, and
    a foam stabilizer, wherein the polyurethane foam produced has an air flow of at least 0.3 $cm^3 \cdot cm^{-2} \cdot s^{-1}$.

2. The polyurethane foam of claim 1 wherein the foam has an air flow of no greater than 8.1 $cm^3 \cdot cm^{-2} \cdot s^{-1}$.

* * * * *